US006553378B1

(12) United States Patent
Eschelbeck

(10) Patent No.: US 6,553,378 B1
(45) Date of Patent: Apr. 22, 2003

(54) SYSTEM AND PROCESS FOR REPORTING NETWORK EVENTS WITH A PLURALITY OF HIERARCHICALLY-STRUCTURED DATABASES IN A DISTRIBUTED COMPUTING ENVIRONMENT

(75) Inventor: Gerhard Eschelbeck, Santa Clara, CA (US)

(73) Assignee: Network Associates, Inc., Santa Clara, CA (US)

(*) Notice: Subject to any disclaimer, the term of this patent is extended or adjusted under 35 U.S.C. 154(b) by 0 days.

(21) Appl. No.: 09/541,365

(22) Filed: Mar. 31, 2000

(51) Int. Cl.[7] .............................. G06F 17/30; G06F 7/00
(52) U.S. Cl. ............................................. 707/10; 707/1
(58) Field of Search .................. 707/10, 1, 9; 709/202, 709/223, 217; 345/965

(56) References Cited

U.S. PATENT DOCUMENTS

| | | | | |
|---|---|---|---|---|
| 5,432,932 A | * | 7/1995 | Chen et al. .................. | 345/965 |
| 5,655,081 A | * | 8/1997 | Bonnell et al. ............. | 709/202 |
| 5,872,931 A | * | 2/1999 | Chivaluri .................... | 709/202 |
| 5,958,010 A | * | 9/1999 | Agarwal et al. ............ | 709/223 |
| 6,332,163 B1 | * | 12/2001 | Bowman-Amuah ......... | 709/217 |

OTHER PUBLICATIONS

M. Pietrek, "Learn System–Level Win32 Coding Techniques by Writing an API Spy Program," vol. 9, No. 12, Microsoft Systems Journal, Microsoft Press (Dec. 1994).

T. Fraser et al., "Hardening COTS Software with Generic Software Wrappers," Proc. of the 1999 IEEE Symp. on Security and Privacy, IEEE, Inc. (1999).

* cited by examiner

Primary Examiner—Diane D. Mizrahi
Assistant Examiner—Yicun Wu
(74) Attorney, Agent, or Firm—Patrick J. S. Inouye; Christopher J. Hamaty

(57) ABSTRACT

A system and a process for reporting network events using hierarchically-structured event databases in a distributed computing environment are disclosed. A centralized broker is executed on a designated system within the distributed computing environment. At least one security application is provided as a plug-in component on a client system interfaced remotely to the centralized broker. A local event database is maintained on the client system. The local event database includes a set of entries in which network events generated by the at least one security application are transitorily stored. Network events forwarded from the local event database are received via a communications server service. The communications server service exposes a set of communication interfaces implementing a plurality of event methods. Each communication interface defines an event management function which can be invoked by the centralized broker. Network entries in a centralized event database are accessed responsive to calls on the event management functions by the centralized broker. The centralized event database is maintained on the designated system. The centralized event database includes a set of entries in which network events received via the communications server service are stored.

24 Claims, 11 Drawing Sheets

SYSTEM AND PROCESS FOR REPORTING NETWORK EVENTS WITH A PLURALITY OF HIERARCHICALLY-STRUCTURED DATABASES IN A DISTRIBUTED COMPUTING ENVIRONMENT

CROSS-REFERENCE TO RELATED APPLICATION

This patent application is related to commonly-assigned U.S. pending patent applications Ser. No. 09/540973, entitled "System And Process For Brokering A Plurality Of Security Applications Using A Modular Framework In A Distributed Computing Environment," filed Mar. 31, 2000, pending and Ser. No. 09/541355, entitled "System And Process For Maintaining A Plurality Of Remote Security Applications Using A Modular Framework In A Distributed Computing Environment," filed Mar. 31, 2000, pending, and the disclosures of which are incorporated herein by reference.

FIELD OF THE INVENTION

The present invention relates in general to security application management and, in particular, to a system and process for reporting network events with a plurality of hierarchically-structured databases in a distributed computing environment.

BACKGROUND OF THE INVENTION

Information networks interconnecting a wide range of computational resources have become a mainstay of corporate enterprise computing environments. Typically, several host computer systems are interconnected internally over an intranetwork to which individual workstations and network resources are connected. These intranetworks, also known as local area networks (LANs), make legacy databases and information resources widely available for access and utilization throughout the corporation. These same corporate resources can also be interconnected to wide area networks (WANs), including public information internetworks such as the Internet, to enable internal users access to remote computational resources, such as the World Wide Web, and to allow outside users access to select corporate resources for the purpose of completing limited transactions or data transfer.

Most current internetworks and intranetworks are based on the Transmission Control Protocol/Internet Protocol (TCP/IP) suite, such as described in W. R. Stevens, "TCP/IP Illustrated," Vol. 1, Ch. 1, Addison-Wesley (1994), the disclosure of which is incorporated herein by reference. Computer systems and network devices employing the TCP/IP suite implement a network protocol stack, which includes a hierarchically structured set of protocol layers. Each protocol layer performs a set of pre-defined functions as specified by the official TCP/IP standards set forth in applicable Requests for Comment (RFC).

The growth of distributed computing environments, especially TCP/IP environments, has created an increased need for computer security, particularly for protecting operating system and application software and stored data. A wide range of security applications are needed to ensure effective security. For example, firewalls and intrusion detection systems are necessary to combat would-be network intruders, the so-called "hackers," of the networking world. Similarly, antivirus scanning applications must be regularly executed and, equally importantly, updated, to detect and eradicate "malware" consisting of computer viruses, Trojan horses, and other forms of unauthorized content.

In addition to these forms of reactive security applications, proactive security applications are increasingly being adopted to prevent security breaches from happening. For instance, vulnerability scanners probe and identify potential security risks and concerns. Likewise, "honey pot" or decoy host systems create the illusion of a network of relatively unguarded, virtual hosts within which a would-be hacker can be tracked and identified.

These types of security applications form a powerful arsenal of defensive and offensive tools that can effectively identify and flag various network security events. Typically, these events can be categorized as either logs or alerts. A "log" is an event principally intended to record and inform an administrator of a network security condition of potential interest, for example, the normal shutdown of a client system. An "alert," on the other hand, is a spurious event which may require the attention of an administrator to resolve, for instance, a password which has failed three times in a row and indicates a possible network break-in attempt. Both logs and alerts must be analyzed and, under certain circumstances, such as in a C2-level secure operating environment, maintained in persistent storage.

Whether defensive or offensive, the majority of prior art security applications are directed at addressing specific network security concerns, such as antivirus scanning or intrusion detection. Consequently, most logs and alerts generated by these applications are expressed in proprietary formats with security application- or vendor-specific meanings. Moreover, such logs and alerts are usually communicated only within the limited context of the client system upon which the security application is executing or, when the remote security application is functioning, for instance, as a remote sensor, to a single centralized server. As a result, such proprietary logs and alerts are analyzed in relation to the context of the generating security application and are, therefore, of limited use in determining whether a security concern spanning different security applications, and potentially affecting a larger portion of the network, is present. In short, the cross-security application interaction or cooperation currently found in the art is limited to virtually meaningless for use on an enterprise-wide basis.

A related problem with prior art security applications arises from a lack of scalability. In particular, prior art security applications lack the ability to structure network security event reporting into layers of hierarchical events. Rather, logs and alerts generated by client security applications are maintained in local persistent storages. These logs and alerts might be shared with other client and server systems through proprietary and conventional data transfer means, such as encapsulated within messages sent as User Datagram Protocol (UDP) datagrams. However, as the network topology increases, the reporting of network security events can take an increasingly negative impact on communications bandwidth and available storage. At some point, the transfer of these events becomes unworkable, particularly in network topologies in which a centralized server receives all such events.

Therefore, there is a need for an approach to normalizing network security events, including logs and alerts, from multiple security applications into an arrangement enabling cross-security application analysis and reporting. Such an approach would preferably encapsulate individual security application events into security application-independent objects.

There is a further need for an approach to efficiently reporting network security events, including logs and alerts, in a scalable fashion. Such an approach would preferably store network security events in local event databases associated with each generating client system. The individual local event databases would be hierarchically-structured and network security events cascaded between successive layers to a centralized event database.

SUMMARY OF THE INVENTION

The present invention provides a system and process for processing cross-security application network events using a set of cross-reporting event databases, preferably structured in a hierarchical manner. Individual network events, including log and alert events, are generated by plug-in components operating on client systems. The network events are stored transitorily in local event databases and are forwarded to a centralized security management interface service operating on a centralized system. The local event databases can be structured into layers of nodes which temporarily store and forward the network events received from child nodes. The security management interface service includes a communications server service and database engine for interfacing to the event database. The communications server service also interfaces to one or more alert devices. In addition, an event viewer snap-in component interfaced to the security management interface service can generate graphical and tabular visualizations of the network event data received from the various client systems.

An embodiment of the present invention is a system and a process for reporting network events using hierarchically-structured event databases in a distributed computing environment. A centralized broker is executed on a designated system within the distributed computing environment. At least one security application is provided as a plug-in component on a client system interfaced remotely to the centralized broker. A local event database is maintained on the client system. The local event database includes a set of entries in which network events generated by the at least one security application are transitorily stored. Network events forwarded from the local event database are received via a communications server service. The communications server service exposes a set of communication interfaces implementing a plurality of event methods. Each communication interface defines an event management function which can be invoked by the centralized broker. Network entries in a centralized event database are accessed responsive to calls on the event management functions by the centralized broker. The centralized event database is maintained on the designated system. The centralized event database includes a set of entries in which network events received via the communications server service are stored.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
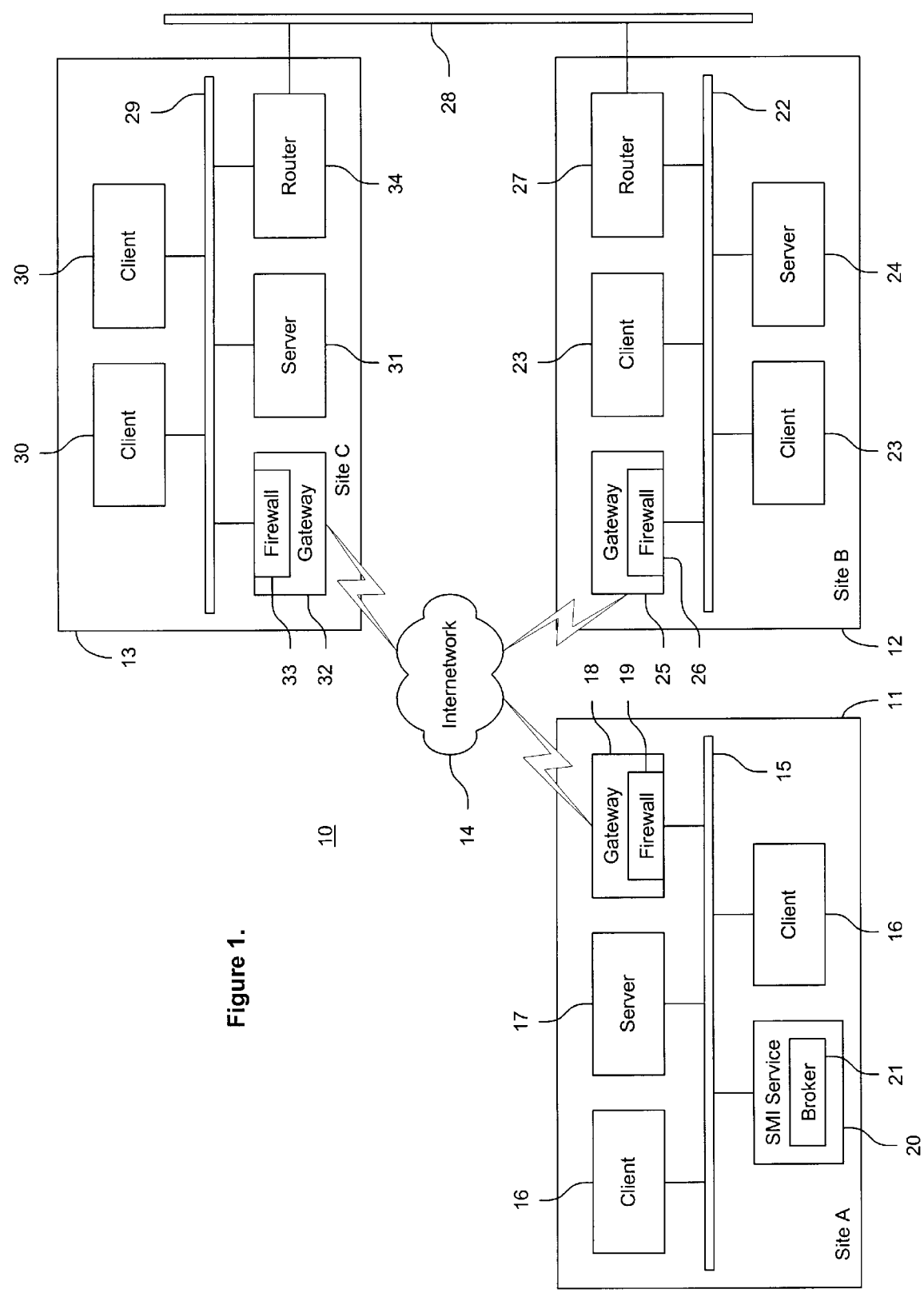
FIG. 1 is a functional block diagram showing a system for maintaining a plurality of remote security applications using a modular framework in a distributed computing environment in accordance with the present invention.

FIG. 1 is a functional block diagram showing a system 10 for maintaining a plurality of remote security applications using a modular framework in a distributed computing environment in accordance with the present invention. A plurality of networked computing sites, including Site "A" 11, Site "B" 12 and Site "C" 13, are interconnected via an internetwork 14, such as the Internet. Each site 11, 12, 13, includes an intranetwork 15, 22, 29, respectively, over which a plurality of networked resources are interconnected. For instance, Site "A" 11 includes a plurality of client systems 16 and a network server system 17. Individual security applications (not shown) are executed on the client systems 16 and network server system 17. The intranetwork 15 is interconnected to the internetwork 14 through a gateway 18 which includes a firewall ("FW") 19.

In addition, Site "A" 11 includes a security management interface ("SMI") service 20 upon which a centralized broker 21 is executed, as further described below with reference to FIG. 2. The security management interface service 20 provides the infrastructure necessary for brokering security applications running on a plurality of clients, integrating snap-in components, accessing a namespace, embedding user interface elements, and handling window messages. The security management interface service 20 could also be run concurrently on several systems for redundancy and load sharing. One centralized broker 21 would be designated as a master centralized broker which would synchronize configuration and database information to backup security management interface services. If the master security management interface service became unavailable, the backup security management interface services would take over managing the security applications. A system and method for interfacing and brokering security applications using a security management interface framework is described in the related, commonly-assigned U.S. patent application Ser. No. 09/540973, entitled "System And Process For Brokering A Plurality Of Security Applications Using A Modular Framework In A Distributed Computing Environment," filed Mar. 31, 2000, pending, the disclosure of which is incorporated herein by reference.

Similarly, Site "B" 12 includes a plurality of client systems 23, a network server system 24, and a gateway 25 with a firewall 26 and Site "C" 13 likewise includes a plurality of clients 30, a network server system 31, and a gateway 32 with a firewall 33. In addition, Site "B" 12 and Site "C" 13 are further interconnected via a dedicated high-speed network link 28 which is interfaced to intranetwork 22 and intranetwork 29 via routers 27 and 34, respectively. Other network topologies and configurations of networks, subnetworks and computational resources are feasible, including various combinations of networking hardware, such as routers, hubs, bridges, gateways and similar devices.

The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage. In the described embodiment, the intranetworks 11, 12, 13 and internetwork 14 implement a Transmission Control Protocol/Internet Protocol (TCP/IP) network stack protocol implementation.

In the described embodiment, a security management interface service 20 suitable for use with the present invention is the Security Management Interface included as part of the CyberCop Monitor network security application, licensed by Network Associates, Inc., Santa Clara, Calif. The Security Management Interface framework includes a single console window from which heterogeneous security applications executed on both local and remote systems can be managed. The console also includes the ability to connect to remote systems via agents, monitor security application activity, change settings, generate reports, and control user access. In addition, through the use of a namespace repository, the Security Management Interface framework can be used to install and configure security applications on both local and remote systems from a centralized system. As well, security results can be collected into event databases on remote systems and retrieved into a central event database for analysis and reporting.

Figure 2:
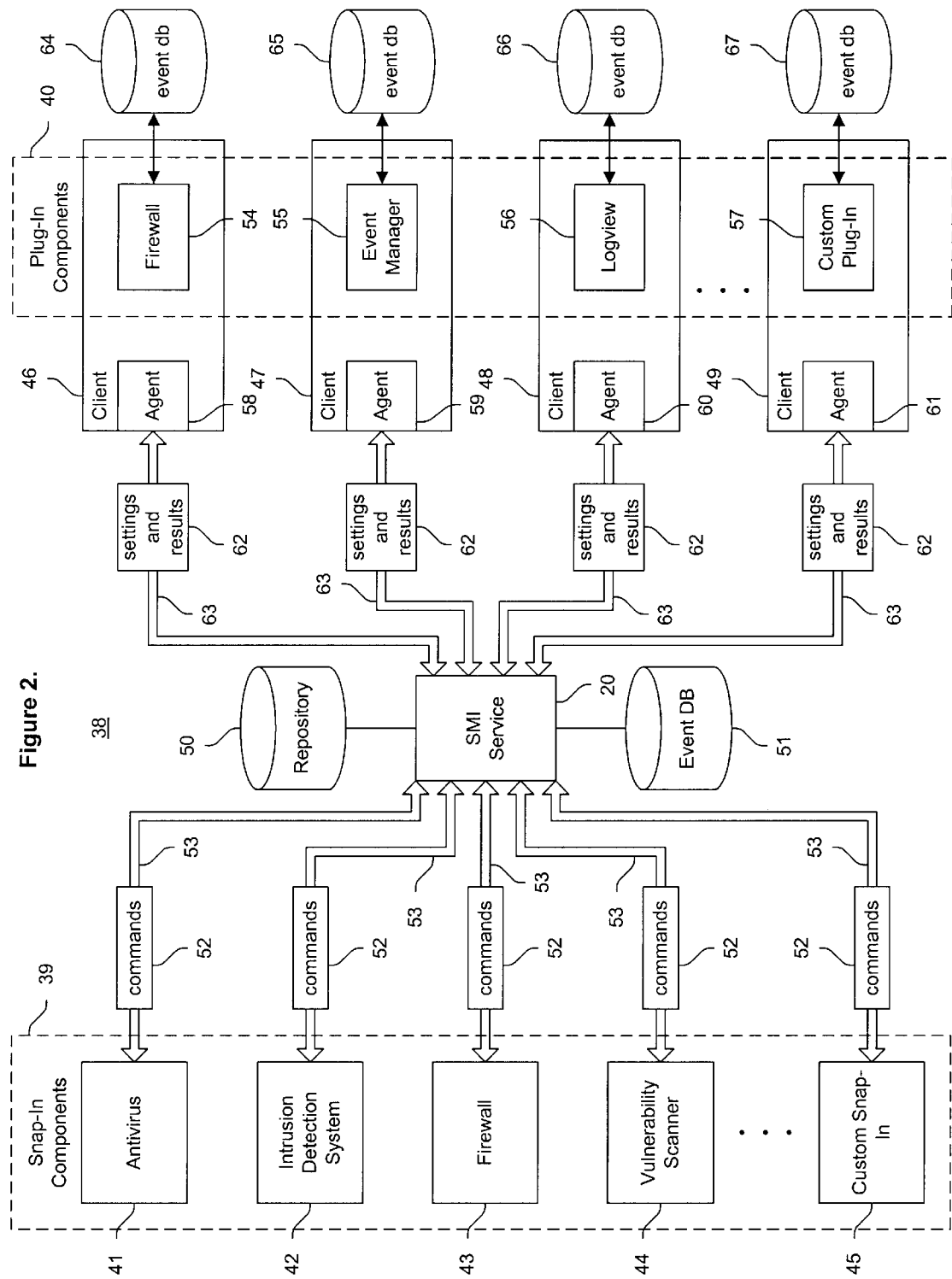
FIG. 2 is a process diagram showing the flow of information through the system of FIG. 1.

FIG. 2 is a process diagram 38 showing the flow of information through the system 10 of FIG. 1. Generally, the security management interface service 20 provides a basic user interface. Commands 52 flow from a set of snap-in components 39 to a set of plug-in components 40 running on clients via the security management interface service 20. In turn, the plug-in components 40 return settings and results 62 also via the security management interface service 20. The plug-in components 40 specialize in providing specific services, which, by way of example, can include an antivirus scanner 41, intrusion detection system 42, firewall 43, vulnerability scanner 44, or a custom security application snap-in component 45. The plug-in components 40 control local security applications and configure data on behalf of their corresponding snap-in component 39. By way of example, the plug-in components 40 can include a firewall 54, event manager 55, log viewer 56, or a custom security application plug-in component 57.

Information flows through the system 10 in accordance with pre-defined programmatic interfaces. The security management interface service 20 and each of the snap-in components 39 expose application programming interfaces (APIs) 53 through which are implemented browser and user interface methods, respectively. The security management interface service 20 interfaces to local and remote clients 46, 47, 48, 49 using an authenticated connection 63 over which are exchanged encrypted packets 62. Each client 46, 47, 48, 49 implements an agent 58, 59, 60, 61, respectively, which provides a communication component for a corresponding plug-in component 40.

Individual clients 46, 47, 48, 49 can store network event data into local event databases 64, 65, 66, 67, respectively. The individual event databases 64, 65, 66, 67 can be hierarchically structured and network event data cascaded upwards into successive levels for eventual logging into a root event database 51 associated with the security management interface service 20. In the described embodiment, the stored network events includes log events, data principally concerning network security conditions of potential interest, and alert events, data regarding spurious network events requiring more immediate attention than log events, although other forms of network event data are feasible. The processing of network events using the hierarchically-structured event databases is further described below with reference to FIG. 4.

In a further embodiment of the described invention, a special snap-in component 39, known as a namespace (not shown), works in conjunction with repository 50 to manage remote security applications executing on the individual clients 46, 47, 48, 49. The namespace and repository 50 enable the security applications to be remotely configured and managed from the centralized broker 21 (shown in FIG. 1) running on the security management interface service 20. A system and method for providing a namespace and repository in a security application management framework is described in the related, commonly-assigned U.S. patent application Ser. No. 09/541355, entitled "System And Process For Maintaining A Plurality Of Remote Security Applications Using A Modular Framework In A Distributed Computing Environment," filed Mar. 31, 2000, pending, the disclosure of which is incorporated herein by reference.

Figure 3:
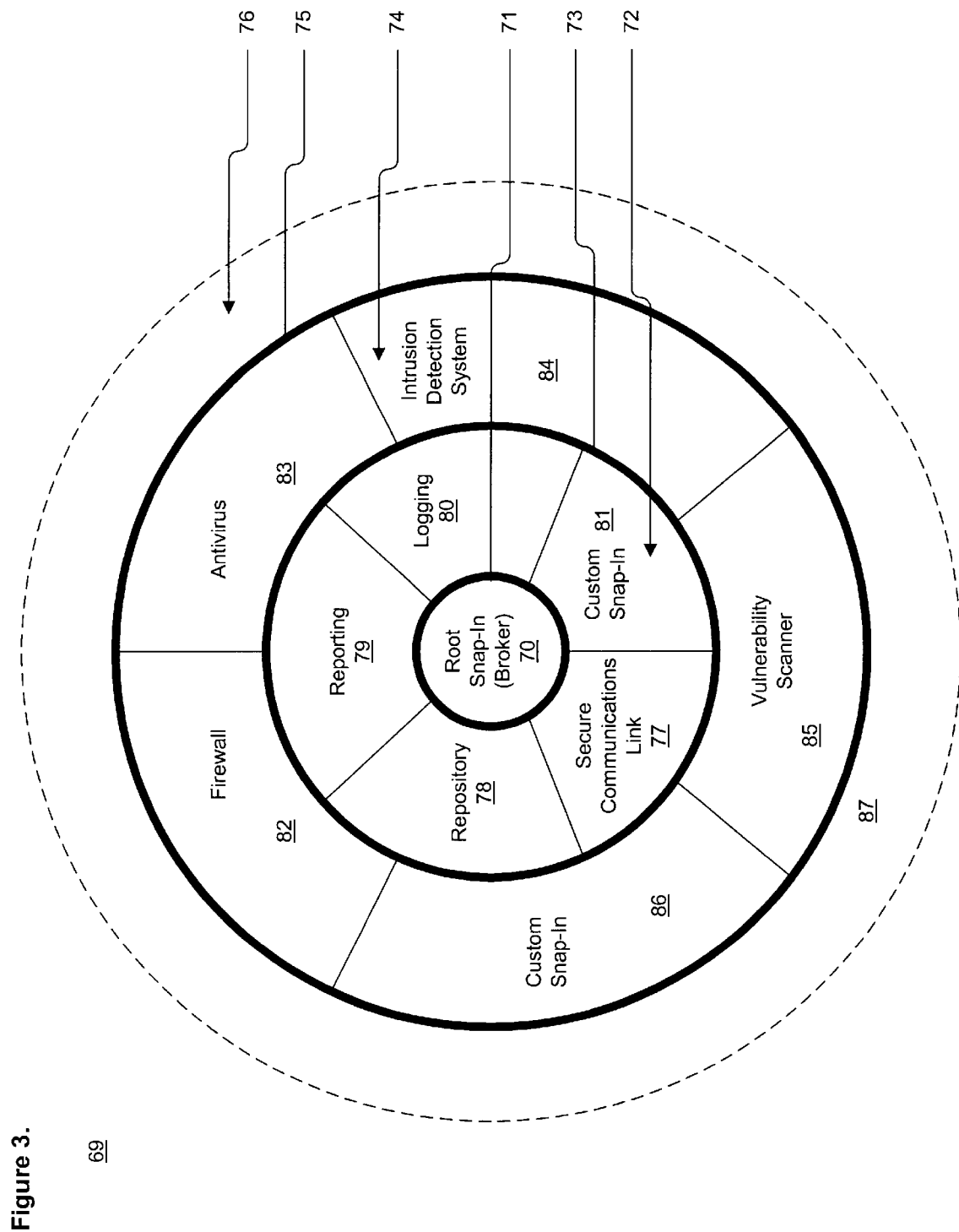
FIG. 3 is a relationship diagram showing the logical layering of the snap-in components of the system of FIG. 1.

FIG. 3 is a relationship diagram 69 showing the logical layering of the snap-in components of the system 10 of FIG. 1. The snap-in components are structured in successive, hierarchical layers 70, 72, 74, 76 with an application programming interface (API) 71, 73, 75 logically separating each layer. The hierarchy is rooted in the security management interface service 20 (shown in FIG. 1) through a root snap-in component 70. This component provides rudimentary user interface functionality via a console window and interfaces to a set of top level snap-in components 72 via a pair of APIs 71. The root snap-in component 70 exposes a console interface implementing a set of browser methods. The top level snap-in components 72 provide security application-independent functionality, such as, secure communications link 77, repository 78, reporting 79, logging 80, and custom top level snap-in component 81. The top-level snap-in components 72 expose a set of snap-in interfaces implementing a set of service methods.

The root snap-in component 70 and top level snap-in components 72 define the basic infrastructure of the security management interface framework. Individual security applications can be grafted onto the basic infrastructure in a similar, layered fashion. Individual security applications interface to the basic infrastructure as security application snap-in components 74. These components configure and control remote security applications (not shown) and include, for example, firewall 82, antivirus scanner 83, intrusion detection system 84, vulnerability scanner 85, and custom security application snap-in component 86. Generally, each security application snap-in component 74 represents only the first layer of a configuration snap-in component tree. Consequently, as needed, the security application snap-in components 74 interface to a set of custom security application snap-in components 76. These components support the security application snap-in components 74 by providing, for example, separate configuration dialogues, and are managed by their respective security application snap-in component 76. Other forms of snap-in component layering are feasible.

Figure 4:
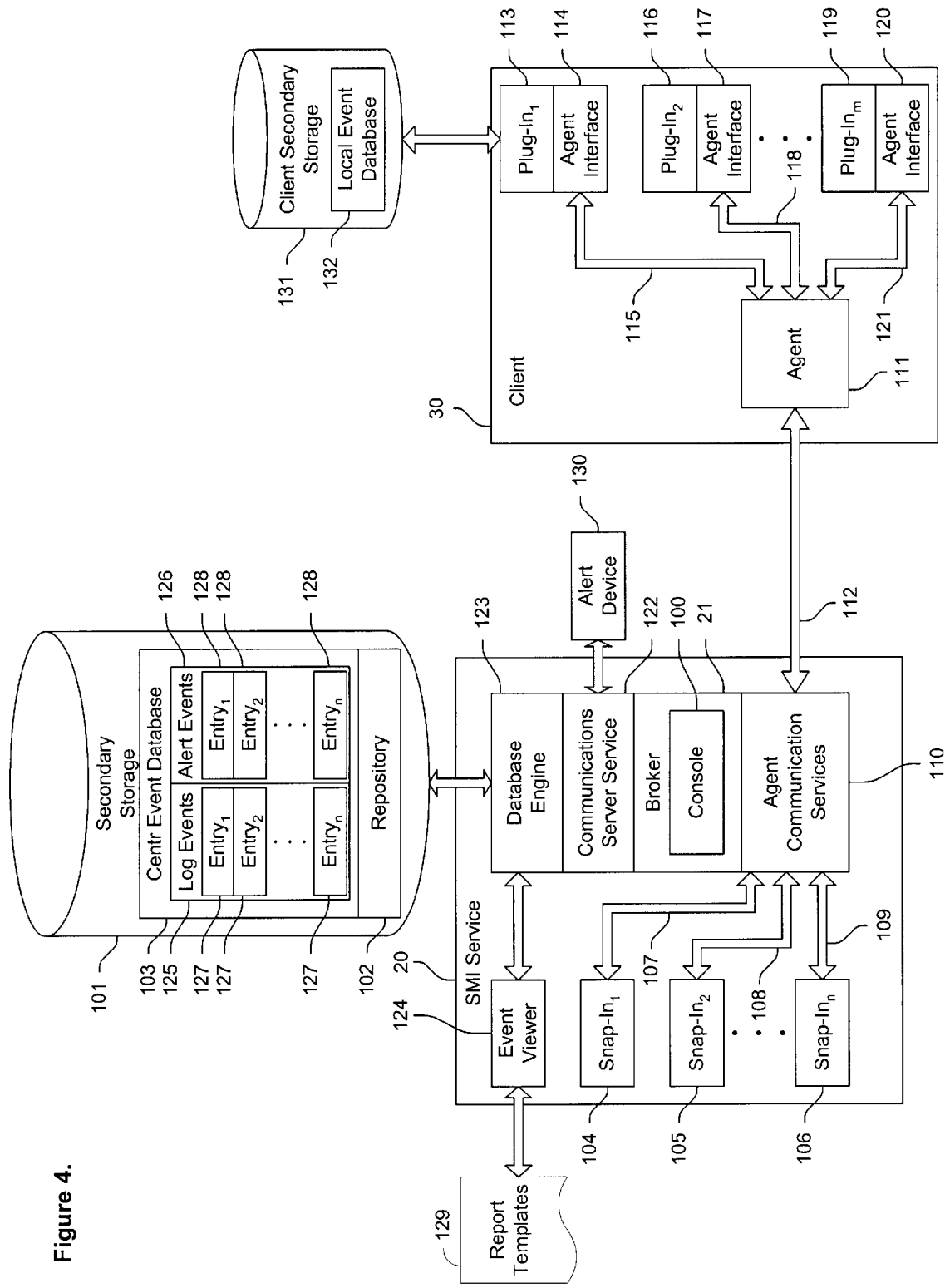
FIG. 4 is a block diagram showing the functional software modules of the system of FIG. 1.

FIG. 4 is a block diagram showing the functional software modules of the system 10 of FIG. 1. Each software module is a computer program written as source code in a conventional programming language, such as the C++ and Visual Basic programming languages, and is presented for execution by the CPU as object or byte code, as is known in the art. The various implementations of the source code and object and byte codes can be held on a computer-readable storage medium or embodied on a transmission medium in a carrier wave. In the described embodiment, the software modules are written in accordance with the Common Object Model (COM), such as described in D. Chappell, "Understanding ActiveX and OLE," Chs. 1–5, Microsoft Press (1996), the disclosure of which is incorporated herein by reference.

On the server side, the security management interface service 20 consists of six sets of components: snap-in components 104, 105, 106; centralized broker 21; secondary storage 101; agent communication service snap-in 110; communications server service 122; and database engine 123. On the client side, there are two sets of components: plug-in components 113, 116, 119; and an agent 111. Snap-in components 104, 105, 106 and plug-in components 113, 116, 119 are described above with reference to FIG. 3.

The centralized broker 21 provides basic management functionality, including exporting a rudimentary user interface via a console window 100 for updating, accessing help functions, and providing proxy services. The snap-in components 104, 105, 106 can asynchronously notify the centralized broker 21 of network events through the console interface, described above with reference to FIG. 3. The secondary storage 101 is used by the security management interface service 20 to store configuration information. In addition, in a further embodiment of the described invention, the secondary storage 101 includes a namespace repository 102 for enabling the installation, configuration and management of remote security.

The agent communication service snap-in 110 on the server side works in conjunction with a corresponding agent 111 on the client side for enabling a security application snap-in component 104, 105, 106 to remotely configure and manage an associated plug-in component 113, 116, 119. Each plug-in component 113, 116, 119 must include an agent interface 114, 117, 120 which communicates to the agent 111 though an agent interface 115, 118, 121. In the described embodiment, the agent communication service 110 and agent 111 communicate via an authenticated channel 112 using a proprietary, encrypted packet format, known as an INetPacket.

The secondary storage 101 also includes an event database 103 for storing network event data received from remote clients. The event database 103 is structured into sections within which are stored log events 125 and alert events 126. Both the sections for log events 125 and alert events 126 include a plurality of event entries 127 and 128, respectively, for storing data on individual network events. In addition, each client system 30 includes a client secondary storage 131 which includes a local event database 132, structured in a manner similar to the event database 103, for transitorily storing network events generated by the plug-in components 40. The transitorily stored network events can include both network events generated locally by the plug-in components 40 of the client system 30 and by plug-in components 40 of other client systems 30, thereby functioning as an intermediate event database.

The security management interface service 20 accesses the event database 103 through a database engine 123 interfaced to the communications server service 122. The communications server service 122 runs as a background daemon process which supports database creation, the saving of network events, managing the product-specific event tables, and configuring alert devices 130.

The communications server service 122 exposes a set of interfaces, INaiEvent, INaiExtraInfoDef, IAlertDevices, and IAlertDevice, as further described below with reference to FIGS. 8–11, respectively, which implement methods for accessing the event databases and alert devices 130. The database engine 123 interfaces directly with the event database 103 and provides the infrastructure by which the event database 103 is organized. In the described embodiment, the database engine 123 is the MS Jet database engine, licensed by Microsoft Corporation, although any other form of database engine could be used.

The network events are consumed by two general classes of devices. First, the alert devices 130 can include either associated hardware components or software modules functioning as device drivers or security applications, including pagers, mobile telephones, electronic mail servers, or operating system event logs. Network events are forwarded to the alert devices 130 by the communications server service 122. Second, other client systems 30 can receive network alerts forwarded from other client systems 30 or from the security management interface service 20 as replicated network events. The forwarded network events emulate raw network event data such as would be received from a plug-in component 40, thereby for enabling centralized network event management.

In a further embodiment, the security management interface service 20 includes an event viewer snap-in component 124 for visualizing the event entries 127, 128 stored in the event database 103 using various report templates 129. Two types of event viewers (not shown) are supported. A graphical event viewer generates graphical reports, such as bar and pie charts. A visual query editor allows Structured Query Language (SQL) queries via a Query-by-Example interface. In the described embodiment, the graphical event viewer is the Crystal Reports Engine, licensed by Seagate Technology, Inc., Scotts Valley, Calif.

The security management interface service 20 operates in accordance with a sequence of process steps, as further described below beginning with reference to FIG. 7.

Figure 5:
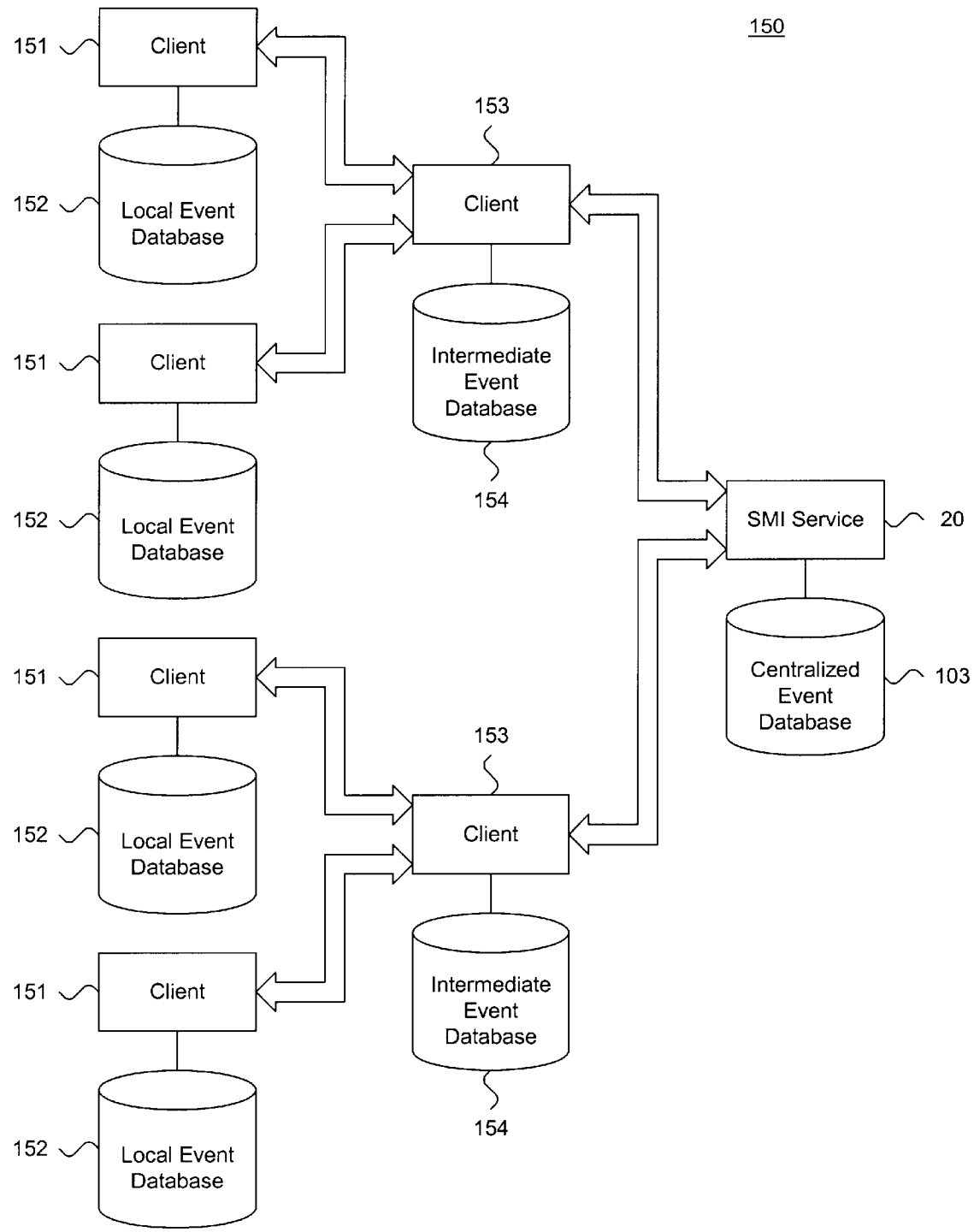
FIG. 5 is a functional block diagram showing the hierarchically-structured event databases of the system of FIG. 1.

FIG. 5 is a functional block diagram showing the hierarchically-structured event databases of the system 10 of FIG. 1. As shown, the event databases are structured into three levels of network event generating "node," although the event databases could equally be structured into any number of levels and interconnections. At the bottom level, a set of client systems 151 with local event databases 152 generate network events. These network events are forwarded to a second set of intermediate client systems 153 with intermediate event databases 154. Network events generated by the client systems 151 are transitorily staged in the intermediate event databases 154 prior to being forwarded to the security management interface service 20. The intermediate client systems 153 can also process and analyze the network events prior to sending them to the security management interface service 20. Alternatively, network events can also be forwarded back to the intermediate client systems 153 from the security management interface service 20 or to the client systems 151 from the intermediate client systems 153. As well, direct connections (not shown) between the security management interface service 20 and individual client systems 151 are also feasible.

Figure 6:
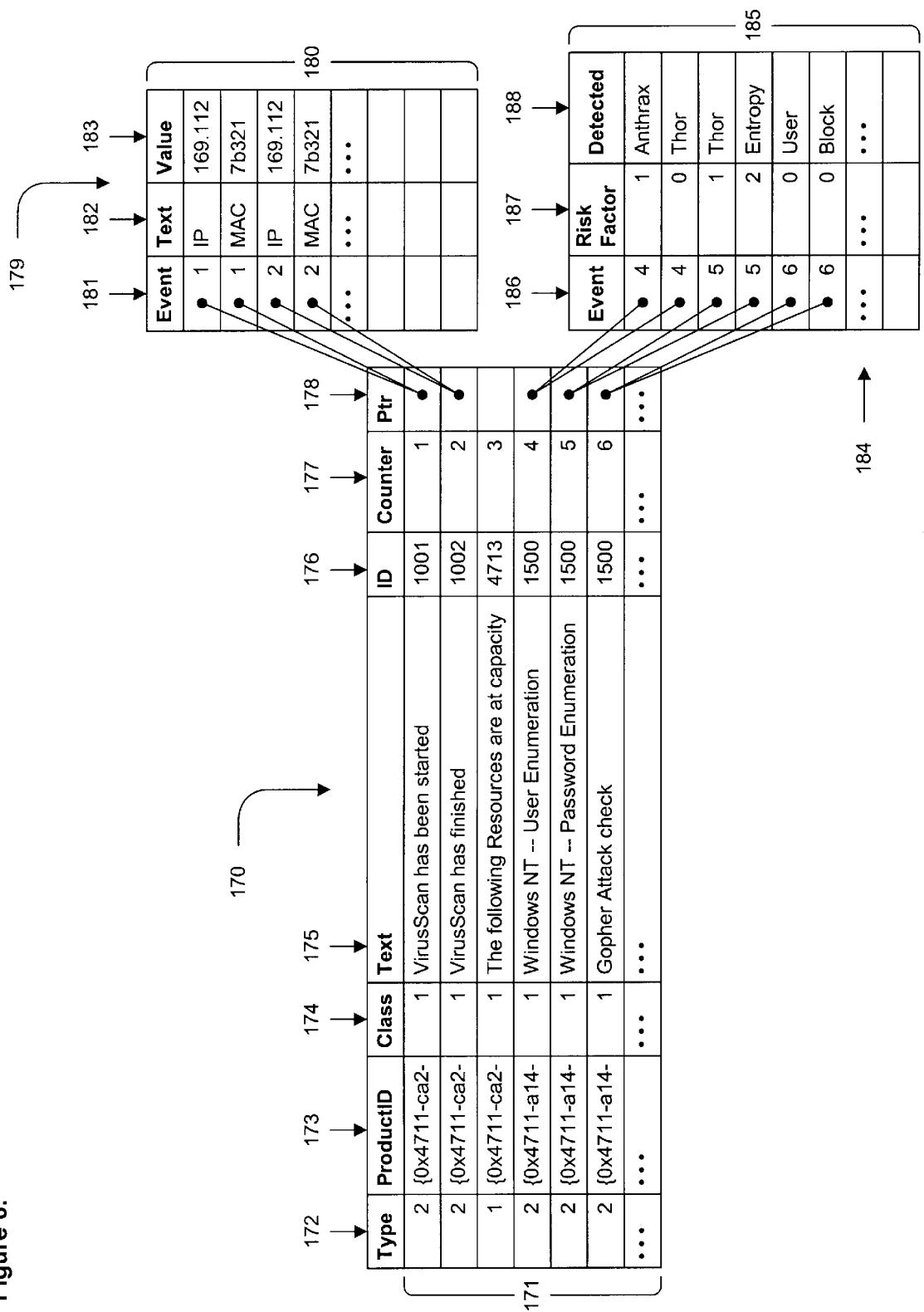
FIG. 6 is a data structure diagram showing the event tables used in the event databases of the system of FIG. 4.

FIG. 6 is a data structure diagram showing the event tables used in the event databases of the system of FIG. 4. A product event table 170 includes a plurality of event entries 171, one entry per network event. One or more product-specific event tables 179, 184 can be defined for storing additional information concerning the network events. The product-specific event tables 179, 184 also each include a plurality of product-specific event entries 180, 185, one product-specific entry for each network event in the product event table 170 to which the product-specific event entry 180, 185 corresponds. Only those event entries 171 in the product event table 170 which require extra information share a one-to-one or one-to-many relationship with product-specific event entries 180, 185 in a corresponding product-specific event table 179, 184.

The product event table 170 includes seven columns for describing the type of the event (Type 172), the identification of the security application which generated the event (ProductID 173), the class of the event (Class 174), a textual description of the event (Text 175), an event identifier (ID 176), an event counter (Counter 177), and one or more address pointers to corresponding entries in a product-specific event table 179, 184, if used (Ptr 178). Other event table structures, including row, column and relationship assignments and arrangements are feasible.

The structure of each product-specific event table 179, 184 is security application dependent. Thus, product-specific event table 179 contains product-specific event entries 180 relating to a virus scanning security application and describe an event number (Event 181), a textual description of the event (Text 182), and a value describing an attribute of the event (Value 183). Similarly, product-specific event table 184 contains product-specific event entries 185 relating to an intrusion detection security application and describe an event number (Event 186), a risk factor assigned to the type of event detected (Risk Factor 187), and the name of the security risk detected (Detected 188). Other event table structures, including row, column and relationship assignments and arrangements are feasible.

Figure 7:
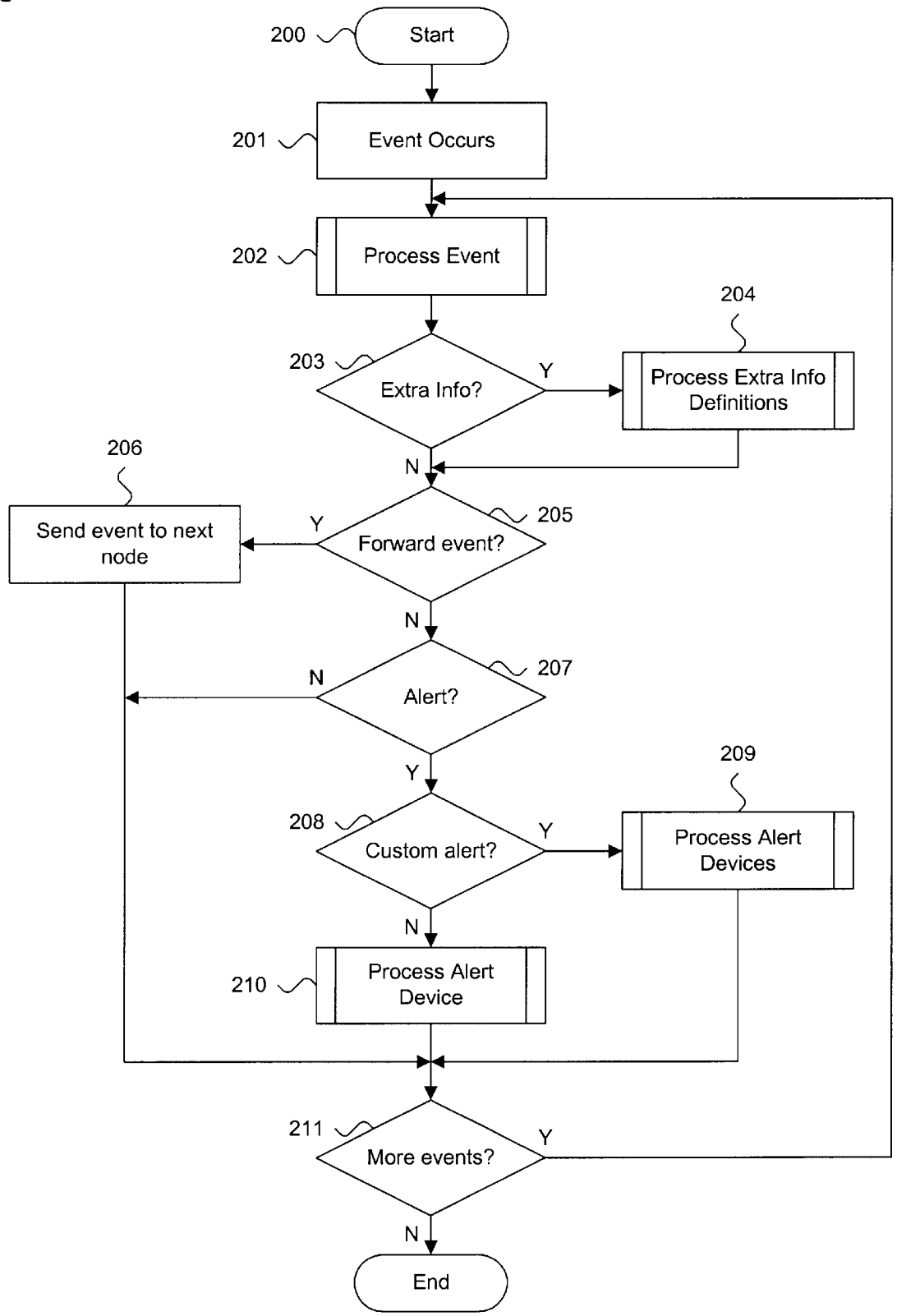
FIG. 7 is a flow diagram showing a process for maintaining a plurality of remote security applications using a modular framework in a distributed computing environment in accordance with the present invention.

FIG. 7 is a flow diagram showing a process for maintaining a plurality of remote security applications 200 using a modular framework in a distributed computing environment in accordance with the present invention. Processing begins with the occurrence of some network event (block 201) on a remote client system 30 (shown in FIG. 4). The network event is then processed in an iterative processing loop (blocks 202–211), as follows.

First, any calls on the methods for processing network events are processed (block 202), as further described below with reference to FIG. 8. If the product-specific extra information is being stored with the network event (block 203), any calls on the methods for processing extra information definitions are processed (block 204), as further described below with reference to FIGURE 9. If the network event is being forwarded to another node (block 205), the network event is sent to that destination node (block 206) within an INetPacket, as described above, and any further network events are processed (block 211). Similarly, if the network event is not an alert event (block 207), no further network event processing is necessary and any further network events are processed (block 211).

If the network event is an alert event (block 207) and is for a custom alert device (block 209), any calls on the methods for processing alert devices are processed (block 209), as further described below with reference to FIG. 10. Otherwise, if the alert event is not for a custom alert device (block 208), any calls on the methods for processing an alert device are processed (block 210), as further described below with reference to FIG. 11. Upon the completion of any alert event processing, if any further network events require processing (block 211), network event processing continues through the iterative processing loop (blocks 202–211). Otherwise, the process terminates.

Figure 8:
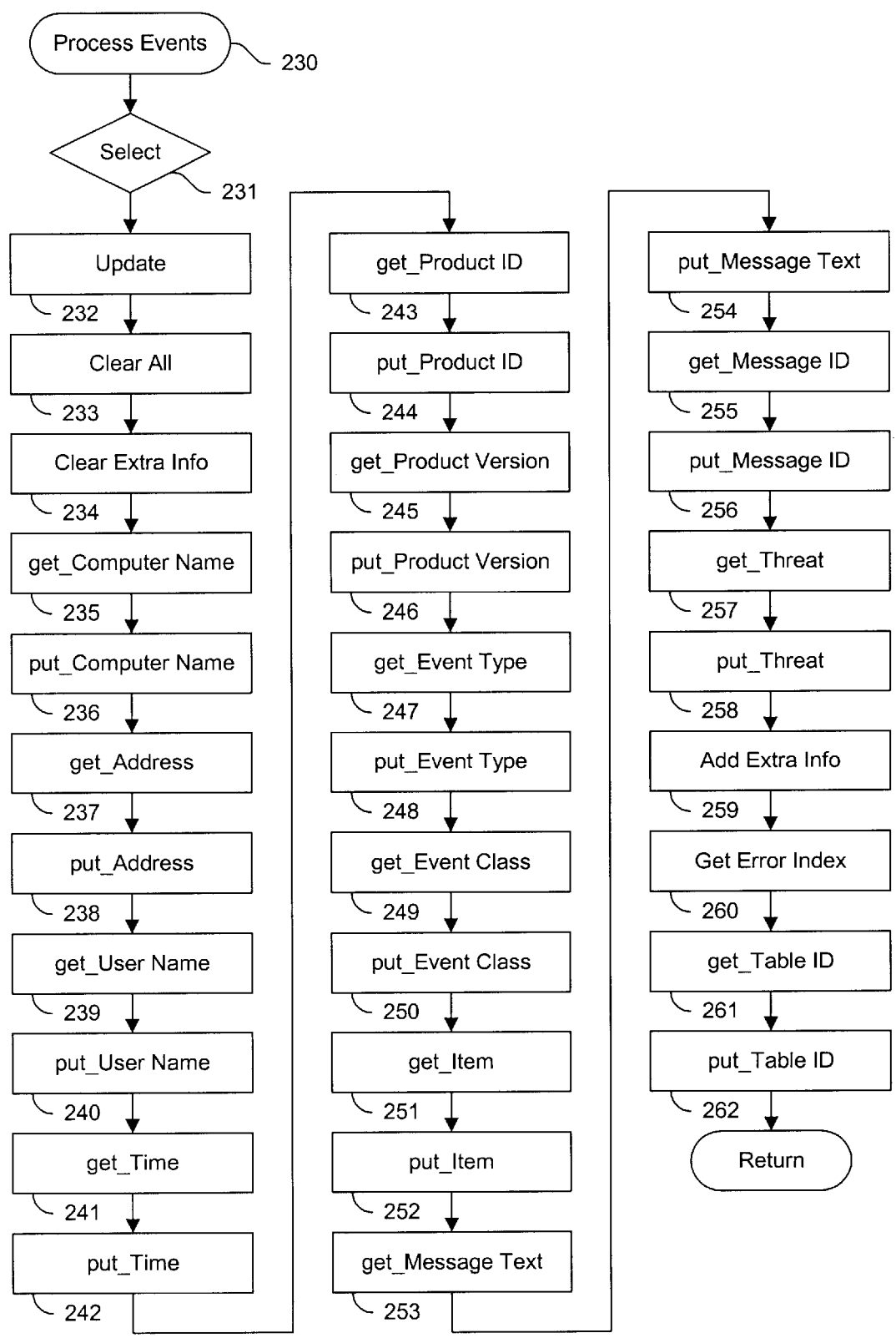
FIG. 8 is a flow diagram showing the routine for processing events for use in the process of FIG. 7.

FIG. 8 is a flow diagram showing the routine for processing events 230 for use in the process of FIG. 7. The purpose of this routine is to process a call on a method implemented in the event interface, INaiEvent, of the security management interface service 20. The event interface supports the recording and reading of network events by the plug-in components 40 from the appropriate network database by providing methods for inserting network events and setting and obtaining their attributes. In the described embodiment, a cache is used to transitorily stage information relating to any given network event.

The appropriate method is selected (block 231) and executed to perform an operation as follows. Update (block 232) writes all cached information to the appropriate event database. ClearAll (block 233) clears all event-related information stored in the cache. ClearExtraInfo (block 234) clears all event-related product-specific extra information stored in the cache with previous calls to the method AddExtraInfo, described below. Get_ComputerName (block 235) obtains the name of the client system 30 where the event occurred. Put_ComputerName (block 236) sets the name of the client system 30 where the event occurred. Get_Address (block 237) obtains the network address of the client system 30 where the event occurred. Put_Address (block 238) sets the network address of the client system 30 where the event occurred. Get_UserName (block 239) obtains the name of the user who caused the event. Put_UserName (block 240) sets the name of the user who caused the event. Get_Time (block 241) obtains the time at which the event occurred. Put_Time (block 242) sets the time at which the event occurred. Get_ProductID (block 243) obtains a unique string identification of the product that caused the event. In the described embodiment, the class identifier (CLSID) of the security application is used. Put_ProductID (block 244) sets the unique string identification of the product that caused the event. Get_ProductVersion (block 245) obtains the version number of the security application. Put_ProductVersion (block 246) sets the version number of the security application. Get_EventType (block 247) obtains the type of the event. Put_EventType (block 248) sets the type of the event. Get_EventClass (block 249) obtains the class of the event. Put_EventClass (block 250) sets the class of the event. Get_Item (block 251) obtains an item concerned or related to the event. Put_Item (block 252) sets the item concerned or related to the event. Get_MessageText (block 253) obtains the description of the event. Put_MessageText (block 254) sets the description of the event. Get_MessageID (block 255) obtains the message identification of the event. Put_MessageID (block 256) sets the message identification of the event. Get_Threat (block 257) obtains the description of the threat that caused the event. Put_Threat (block 258) sets the description of the threat that caused the event. AddExtraInfo (block 259) stores product-specific data for the event in the appropriate event database using a product-specific event table 179, 184 (shown in FIG. 6). GetErrorIndex (block 260) obtains the zero-based column index of the product-specific event table 179, 184 that caused an error in a previous call to the method Update, described above. Get_TableID (block 261) obtains the identification of the product-specific event table 179, 184. Put_TableID (block 262) sets the identification of the product-specific event table 179, 184.

Figure 9:
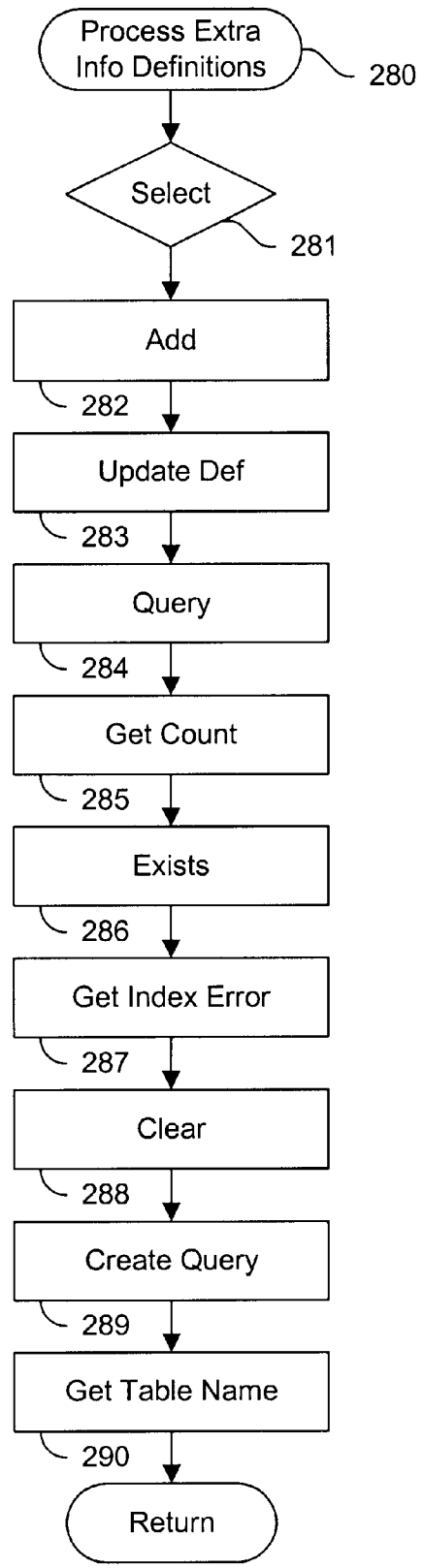
FIG. 9 is a flow diagram showing the routine for processing extra information definitions for use in the process of FIG. 7.

FIG. 9 is a flow diagram showing the routine for processing extra information definitions 280 for use in the process of FIG. 7. The purpose of this routine is to process a call on a method implemented in the extra information definition interface, INaiExtraInfoDef, of the security management interface service 20. The extra information definition interface supports the creation of product event tables 170 (shown in FIG. 6) by providing methods for creating columns within product-specific event tables 179, 184. In the described embodiment, a cache is used to transitorily stage information relating to any extra information.

The appropriate method is selected (block 281) and executed to perform an operation as follows. Add (block 282) adds a column to the product-specific event table 179, 184. UpdateDef (block 283) creates a product-specific event table 179, 184 in the appropriate event database. Query (block 284) obtains the definition of a specific column of the product event table 170 (shown in FIG. 6). GetCount (block 285) obtains the number of columns of the product-specific event table 179, 184. Exists (block 286) checks whether the product-specific event table 179, 184 is already defined for a security application with a given version and table identification. GetIndexError (block 287) obtains the zero-based index of the column in the product-specific event table 179, 184 that caused an error in the previous call to the method UpdateDef, described above. Clear (block 288) clears all product-specific event extra information from the cache. CreateQuery (block 289) defines a query that joins all tables for a specific security application. GetTableName (block 290) obtains the name of a product-specific event table 179, 184.

Figure 10:
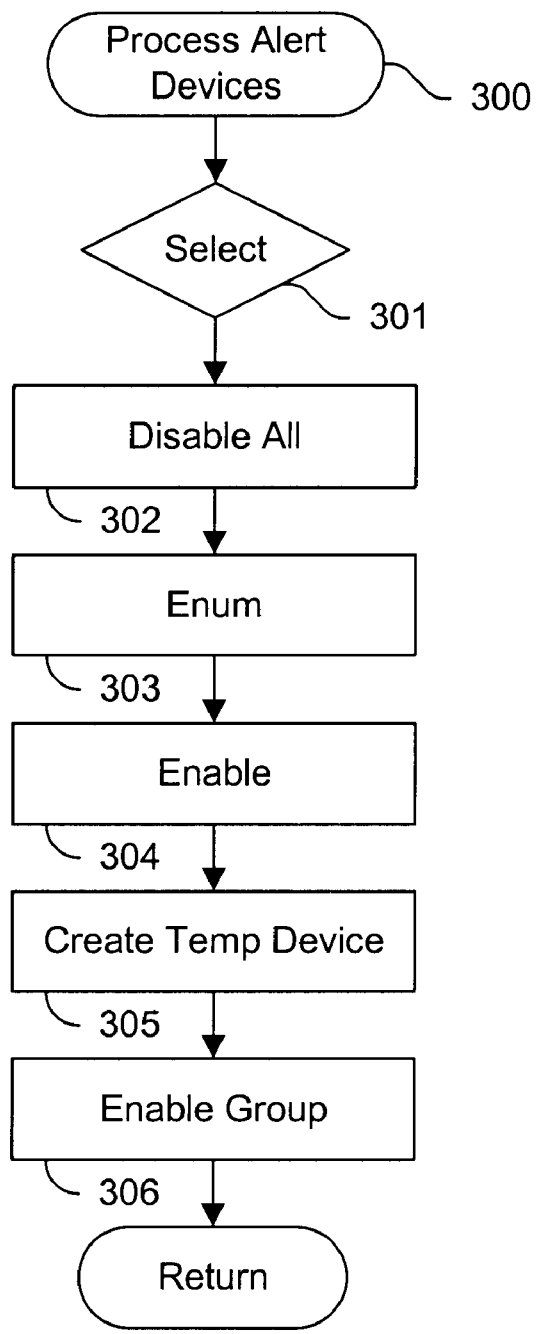
FIG. 10 is a flow diagram showing the routine for processing alert devices for use in the process of FIG. 7.

FIG. 10 is a flow diagram showing the routine for processing alert devices 300 for use in the process of FIG. 7. The purpose of this routine is to process a call on a method implemented in the alert devices interface, IAlertDevices, of the security management interface service 20. The appropriate method is selected (block 301) and executed to perform an operation as follows. DisableAll (block 302) disables all default alert devices from sending alerts. Enum (block 303) obtains an enumerator interface for all default alert device objects through the IAlertDevice interface, further described below with reference to FIG. 11. Enable (block 304) enables a particular alert device object for sending alerts. CreateTempDevice (block 305) creates a temporary alert device target object and provides an IalertDevice interface pointer to that object. EnableGroup (block 306) enables a group of default devices of a specific type for sending alerts.

Figure 11:
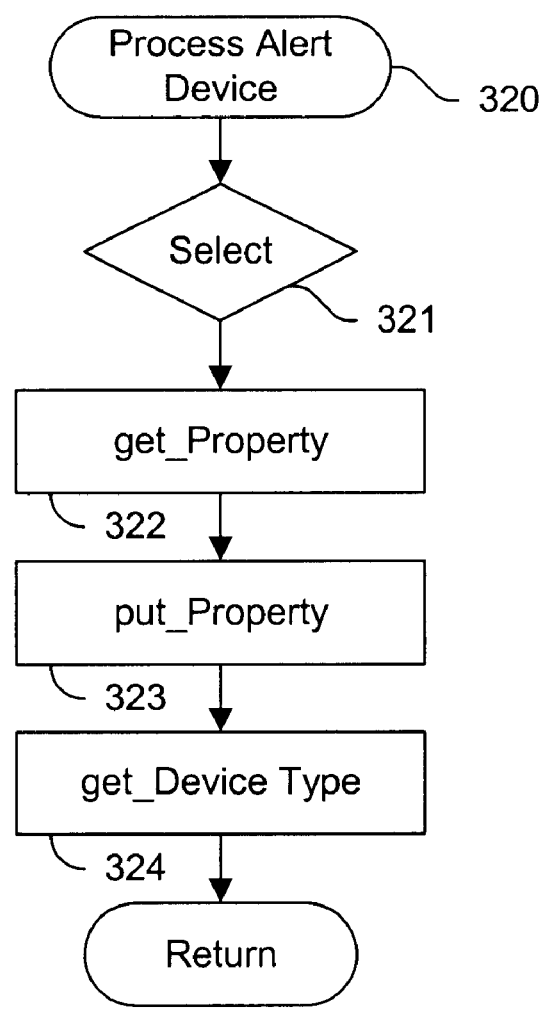
FIG. 11 is a flow diagram showing the routine for processing an alert device for use in the process of FIG. 7.

FIG. 11 is a flow diagram showing the routine for processing an alert device 320 for use in the process of FIG. 7. The purpose of this routine is to process a call on a method implemented in the alert device interface, IAlertDevice, of the security management interface service 20. The appropriate method is selected (block 321) and executed to perform an operation as follows. Get_Property (block 322) obtains the description for a specific property of an alert device. Put_Property (block 323) sets the description for a specific property of an alert device. Get_DeviceType (block 324) obtains the type of the alert device object.

While the invention has been particularly shown and described as referenced to the embodiments thereof, those skilled in the art will understand that the foregoing and other changes in form and detail may be made therein without departing from the spirit and scope of the invention.

What is claimed is:

1. A system for reporting network events using hierarchically-structured event databases in a distributed computing environment, comprising:

a centralized broker executing on a designated system within the distributed computing environment;

at least one security application provided as a plug-in component on a client system interfaced remotely to the centralized broker;

a local event database maintained on the client system and comprising a set of entries in which network events generated by the at least one security application are transitorily stored;

a communications server service receiving network events forwarded from the local event database and exposing a set of communication interfaces implementing a plurality of event methods which each define an event management function which can be invoked by the centralized broker;

a database engine accessing network entries in a centralized event database responsive to calls on the event management functions by the centralized broker;

the centralized event database maintained on the designated system and comprising a set of entries in which network events received via the communications server service are stored;

a local security application interfaced with the centralized broker as a snap-in component comprising at least one of an antivirus scanner and a firewall, the local security application providing controls for viewing the network events;

at least one intermediate security application executing as a plug-in component on an intermediate client system remotely interfaced to the centralized broker and logically situated within the distributed computing environment between the client system and the designated system; and a local intermediate event database maintained on the intermediate client system and comprising a set of entries in which network events forwarded from the local event database are transitorily staged.

2. A system according to claim 1, further comprising:
the security application describing at least one such network event generated by the security application as a log event communicating a dataset result.

3. A system according to claim 2, further comprising:
the security application grouping each log event describing a similar dataset result into a class.

4. A system according to claim 1, further comprising:
the security application describing at least one such network event generated by the security application as an alert event communicating a security notification.

5. A system according to claim 4, further comprising:

the security application assigning a priority to each alert event representing a pre-defined severity level.

6. A system according to claim 1, wherein the local security application comprises at least one of a database query application and a graphical report generation application.

7. A system according to claim 1, further comprising:

at least one alerting device communicatively interfaced to the centralized broker, the communications server service dispatching the at least one alerting device responsive to calls on the event management functions by the centralized broker.

8. A system according to claim 7, wherein the alerting device comprises at least one of a pager device and an electronic mail device.

9. A system according to claim 1, wherein the set of communication interfaces is COM-compliant.

10. A process for reporting network events using hierarchically-structured event databases in a distributed computing environment, comprising:

executing a centralized broker on a designated system within the distributed computing environment;

providing at least one security application as a plug-in component on a client system interfaced remotely to the centralized broker;

maintaining a local event database on the client system, the local event database comprising a set of entries in which network events generated by the at least one security application are transitorily stored;

receiving network events forwarded from the local event database via a communications server service which exposes a set of communication interfaces implementing a plurality of event methods which each define an event management function which can be invoked by the centralized broker;

accessing network entries in a centralized event database responsive to calls on the event management functions by the centralized broker;

maintaining the centralized event database on the designated system, the centralized event database comprising a set of entries in which network events received via the communications server service are stored;

interfacing a local security application with the centralized broker as a snap-in component comprising at least one of an antivirus scanner and a firewall, the local security application providing controls for viewing the network events;

executing at least one intermediate security application as a plug-in component on an intermediate client system remotely interfaced to the centralized broker and logically situated within the distributed computing environment between the client system and the designated system; and maintaining a local intermediate vent database on the intermediate client system and comprising a set of entries in which network events forwarded from the local event database are transitorily staged.

11. A process according to claim 10, further comprising:

describing at least one such network event generated by the security application as a log event communicating a dataset result.

12. A process according to claim 10, further comprising:

grouping each log event describing a similar dataset result into a class.

13. A process according to claim 10, further comprising:

describing at least one such network event generated by the security application as an alert event communicating a security notification.

14. A process according to claim 13, further comprising:

assigning a priority to each alert event representing a pre-defined severity level.

15. A process according to claim 10, wherein the local security application comprises at least one of a database query application and a graphical report generation application.

16. A process according to claim 10, further comprising:

communicatively interfacing at least one alerting device to the centralized broker, the communications server service dispatching the at least one alerting device responsive to calls on the event management functions by the centralized broker.

17. A process according to claim 16, wherein the alerting device comprises at least one of a pager device and an electronic mail device.

18. A process according to claim 10, wherein the set of communication interfaces is COM-compliant.

19. A computer-readable storage medium holding code for reporting network events using hierarchically-structured event databases in a distributed computing environment, comprising:

executing a centralized broker on a designated system within the distributed computing environment;

providing at least one security application as a plug-in component on a client system interfaced remotely to the centralized broker, maintaining a local event database on the client system, the local event database comprising a set of entries in which network events generated by the at least one security application are transitorily stored;

receiving network events forwarded from the local event database via a communications server service which exposes a set of communication interfaces implementing a plurality of event methods which each define an event management function which can be invoked by the centralized broker;

accessing network entries in a centralized event database responsive to calls on the event management functions by the centralized broker;

maintaining the centralized event database on the designated system, the centralized event database comprising a set of entries in which network events received via the communications server service are stored; and interfacing a local security application with the centralized broker as a snap-in component comprising at least one of an antivirus scanner and a firewall, the local security application providing controls for viewing the network events;

executing at least one intermediate security application as a plug-in component on an intermediate client system remotely interfaced to the centralized broker and logically situated within the distributed computing environment between the client system and the designated system; and maintaining a local intermediate event database on the intermediate client system and comprising a set of entries in which network events forwarded from the local event database are transitorily staged.

20. A storage medium according to claim 19, further comprising:

describing at least one such network event generated by the security application as a log event communicating a dataset result.

21. A storage medium according to claim 20, further comprising:

grouping each log event describing a similar result into a class.

22. A storage medium according to claim 19, further comprising:

describing at least one such network event generated by the security application alert event communicating a security notification.

23. A storage medium according to claim 22, further comprising:

assigning a priority to each alert event representing a pre-defined severity level.

24. A storage medium according to claim 19, further comprising:

communicatively interfacing at least one alerting device to the centralized broker, the communications server service dispatching the at least one alerting device responsive to calls on the event management functions by the centralized broker.

* * * * *